United States Patent
Barton et al.

(10) Patent No.: US 9,631,814 B1
(45) Date of Patent: Apr. 25, 2017

(54) ENGINE ASSEMBLIES AND METHODS WITH DIFFUSER VANE COUNT AND FUEL INJECTION ASSEMBLY COUNT RELATIONSHIPS

(71) Applicant: HONEYWELL INTERNATIONAL INC., Morristown, NJ (US)

(72) Inventors: Michael T. Todd Barton, Phoenix, AZ (US); Samir Rida, Phoenix, AZ (US); Ian Critchley, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 540 days.

(21) Appl. No.: 14/161,941

(22) Filed: Jan. 23, 2014

(51) Int. Cl.
*F23R 3/10* (2006.01)
*F23R 3/28* (2006.01)

(52) U.S. Cl.
CPC . *F23R 3/10* (2013.01); *F23R 3/28* (2013.01)

(58) Field of Classification Search
CPC ...... F23R 3/10; F23R 3/28; F23R 3/14; F23R 3/04
USPC .......................... 60/746, 740, 747; 29/888.012
See application file for complete search history.

(56) References Cited

U.S. PATENT DOCUMENTS

| | | | |
|---|---|---|---|
| 2,682,363 A | 6/1954 | Lombard et al. | |
| 4,356,693 A * | 11/1982 | Jeffery | F23R 3/04 60/39.37 |
| 4,693,074 A * | 9/1987 | Pidcock | F23C 3/00 60/740 |
| 4,918,926 A * | 4/1990 | Nikkanen | F23R 3/04 60/751 |
| 5,109,671 A | 5/1992 | Haasis | |
| 5,320,489 A | 6/1994 | McKenna | |
| 5,479,774 A * | 1/1996 | Burnell | F23R 3/10 60/756 |
| 5,592,820 A * | 1/1997 | Alary | F01D 9/02 60/751 |
| 5,749,219 A | 5/1998 | DuBell | |
| 5,839,283 A | 11/1998 | Dobbeling | |
| 7,036,316 B2 | 5/2006 | Howell et al. | |
| 7,147,433 B2 | 12/2006 | Ghizawi | |

(Continued)

FOREIGN PATENT DOCUMENTS

| | | |
|---|---|---|
| GB | 2143938 A | 2/1985 |
| WO | 2009003144 A2 | 12/2008 |
| WO | 2012092501 A1 | 7/2012 |

OTHER PUBLICATIONS

Extended EP search report for EP 14189430.3-1607 dated Dec. 6, 2015.

(Continued)

*Primary Examiner* — Steven A. Reynolds
(74) *Attorney, Agent, or Firm* — Lorenz & Kopf, LLP

(57) ABSTRACT

An engine assembly includes a compressor section configured to supply compressed air and a combustion section coupled to the compressor section. The compressor section includes a diffuser with diffuser vanes to condition the compressed air, and the diffuser vanes have a vane count of a first value. The combustion section includes a combustion chamber to receive the compressed air and fuel injection assemblies configured to introduce fuel into the combustion chamber. The fuel injection assemblies have a fuel injection assembly count of a second value, and the first value is a whole number multiple of the second value.

14 Claims, 6 Drawing Sheets

(56) References Cited

U.S. PATENT DOCUMENTS

| | | |
|---|---|---|
| 7,152,409 B2 | 12/2006 | Yee et al. |
| 7,497,666 B2 | 3/2009 | Garris, Jr. |
| 7,717,672 B2 | 5/2010 | Barton et al. |
| 8,192,688 B2 | 6/2012 | Hagen et al. |
| 8,485,778 B2 | 7/2013 | Zhang et al. |
| 8,499,542 B2 | 8/2013 | Zebrowski |
| 8,528,334 B2 | 9/2013 | Dutta et al. |
| 2007/0234735 A1 | 10/2007 | Mosbacher et al. |
| 2008/0078182 A1 | 4/2008 | Evulet |
| 2009/0047127 A1* | 2/2009 | Commaret .............. F02C 3/08 415/211.2 |
| 2009/0266080 A1 | 10/2009 | Pieussergues et al. |
| 2012/0152007 A1 | 6/2012 | Holmes et al. |
| 2012/0271527 A1 | 10/2012 | Zebrowski et al. |

OTHER PUBLICATIONS

Three-Dimensional Analysis of Hot Streak Attenuation in a High Pressure Turbine Stage; 38th AIAA/ASME/SAE/ASEE Joint Propulsion Conference & Exhibit. Publication date: Jul. 7, 2002-Jul. 10, 2002. [Retrieved from Internet http://arc.aiaa.org/doi/abs/10.2514/6.2002-3646].

Introducing an Innovative Gas Turbine Engine Configuration [910102]; Innovator's Digest 91.1 (Jan. 1, 1991). [Retrieved from Internet http://search.proquest.com/professional/docview/668276027/14193B2B50D2A8A8EC3/1?. . . ].

* cited by examiner

US 9,631,814 B1

ENGINE ASSEMBLIES AND METHODS WITH DIFFUSER VANE COUNT AND FUEL INJECTION ASSEMBLY COUNT RELATIONSHIPS

STATEMENT REGARDING FEDERALLY SPONSORED RESEARCH OR DEVELOPMENT

This invention was made with Government support under W911W6-08-2-0001 awarded by the U.S. Army. The Government has certain rights in this invention.

TECHNICAL FIELD

The present invention generally relates to gas turbine engine assemblies and methods, and more particularly relates to the compressor and combustion systems of gas turbine engines.

BACKGROUND

Aircraft engines are used for a number of purposes, including propulsion and/or driving various other components such as, for example, generators, compressors, and pumps, to thereby supply electrical, pneumatic, and/or hydraulic power. Generally, a gas turbine engine includes a compressor section, a combustion section, and a turbine section. During operation, the compressor section draws in ambient air, compresses the air with one or more compressors, and supplies the compressed air to the combustion section. The compressor section typically includes a diffuser that diffuses the compressed air before it is supplied to the combustion section. In addition to the compressed air, the combustion section receives fuel via a fuel injection assembly, mixes the fuel with the compressed air, ignites the mixture, and supplies the high energy combustion gases to the turbine section to drive one or more turbines, including a shaft that may be used to drive the compressor and other components.

As introduced above, the diffuser functions to condition the compressed air upstream of the combustion section. Considering the three dimensions of axial, radial, and circumferential air flow in the annular engine, advantageously conditioning the compressed air for desirable combustion characteristics may be difficult. Such conditioning considerations must be weighed with respect to weight, cost, efficiency, and complexity. As an example, the diffuser may include a ring of diffuser vanes and designers generally attempt to select a vane count to balance these considerations. Numerous other engine considerations are evaluated with respect to the compressor, combustion, and turbine sections. Given the various considerations and complexities of engine characteristics, designers typically do not consider the ramifications of a diffuser design with respect to other components, particularly those of the combustion and/or turbine sections.

Accordingly, it is desirable to provide gas turbine engine assemblies with improved life span, efficiency, performance, and cost. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine assembly includes a compressor section configured to supply compressed air and a combustion section coupled to the compressor section. The compressor section includes a diffuser with a plurality of diffuser vanes to condition the compressed air, and the plurality of diffuser vanes has a vane count of a first value. The combustion section includes a combustion chamber to receive the compressed air and a plurality of fuel injection assemblies configured to introduce fuel into the combustion chamber. The plurality of fuel injection assemblies has a fuel injection assembly count of a second value, and the first value is a whole number multiple of the second value.

In accordance with another exemplary embodiment, a method is provided for designing an engine assembly. The method includes providing a compressor section configured to supply compressed air, the compressor section having a diffuser with a plurality of diffuser vanes to condition the compressed air; providing a combustion section coupled to the compressor section, the combustion section comprising a combustion chamber to receive the compressed air and a plurality of fuel injection assemblies configured to introduce fuel into the combustion chamber; and selecting a fuel injection assembly count and a diffuser vane count such that the diffuser vane count is a whole number multiple of the fuel injection assembly count.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to engine assemblies with a compressor section and a combustion section. The compressor section includes a vaned diffuser, and the combustion section includes fuel injection assemblies. The vane count and fuel injection assembly count may have a predetermined relationship, such as equal counts, such that optimal positioning may be selected, thus resulting in a reduced pattern factor.

Figure 1:
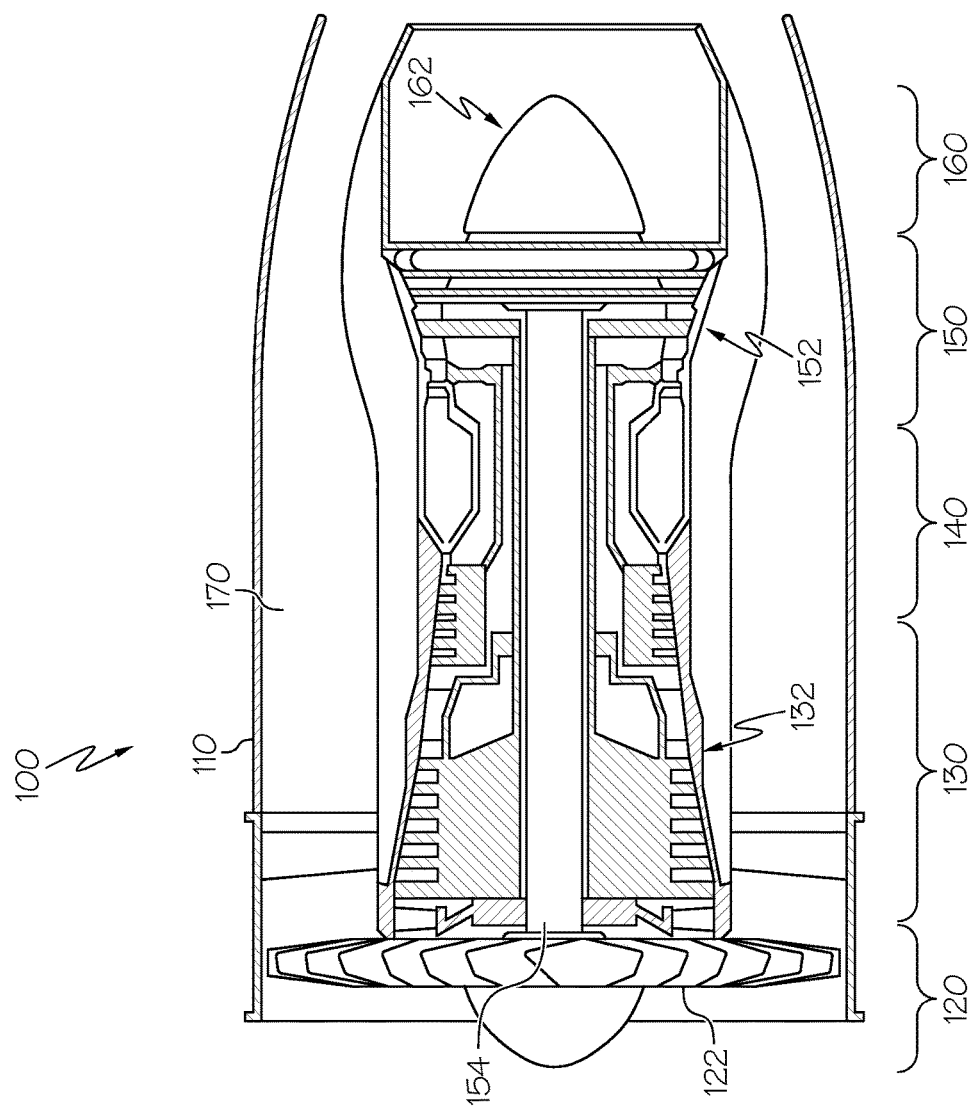
FIG. 1 is a schematic cross-sectional view of a gas turbine engine in accordance with an exemplary embodiment.

FIG. 1 is a simplified, cross-sectional view of a gas turbine engine 100 according to an exemplary embodiment. The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132, which raise the pressure of the air directed into it from the fan 122. The compressors 132 may direct the compressed air into the combustion section 140. The compressor section 130 may be implemented as any one of numerous types of compressors, including centrifugal compressors. As described in greater detail below, the compressor section 130 includes a diffuser (not shown in FIG. 1) for conditioning the air flowing from the compressor section 130 to the combustion section 140.

In the combustion section 140, the high pressure air is mixed with fuel via a fuel injection assembly (not shown in FIG. 1) and combusted to produce relatively high-energy combustion gas. The combusted air is then directed into the turbine section 150. The combustion section 140 may be implemented as any one of numerous types of combustors, including various can-type combustors, various reverse-flow combustors, various through-flow combustors, and various slinger combustors.

The turbine section 150 may include a series of turbines 152 disposed in axial flow series. The combusted air from the combustion section 140 expands through and rotates the turbines 152. The air is then exhausted through a propulsion nozzle 162 disposed in the exhaust section 160, thereby providing additional forward thrust. In one embodiment, the turbines 152 rotate to thereby drive equipment in the engine 100 via concentrically disposed shafts or spools. Specifically, the turbines 152 may drive the compressor 132 via one or more rotors 154.

Figure 2:
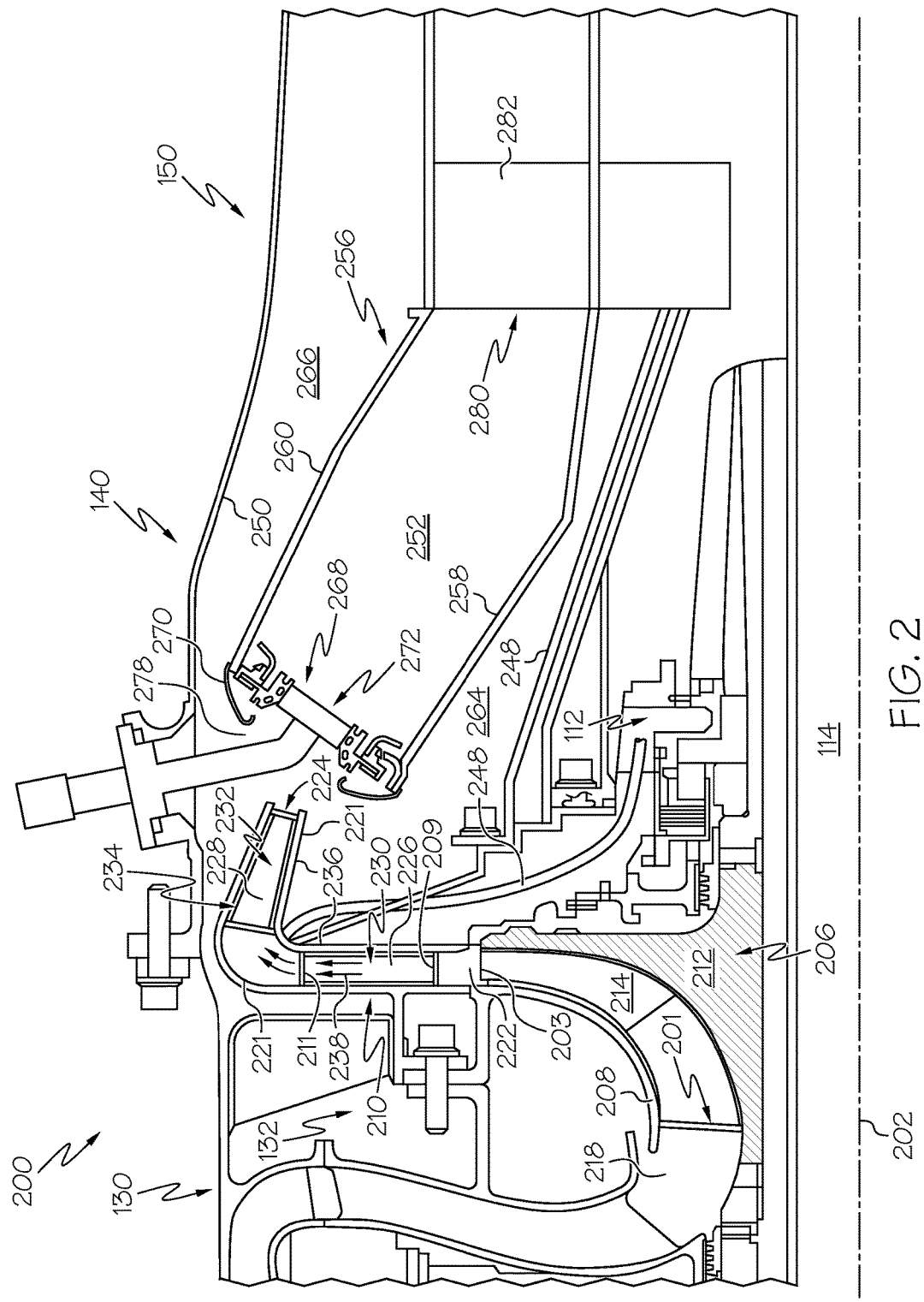
FIG. 2 is a partial cross-sectional view of an engine assembly of the gas turbine engine of FIG. 1 in accordance with an exemplary embodiment.

FIG. 2 is a more detailed cross-sectional view of an engine assembly 200 of the gas turbine engine of FIG. 1 in accordance with an exemplary embodiment. In particular, FIG. 2 depicts a partial, cross-sectional view of a portion of the compressor section 130, a portion of the combustion section 140, and a portion of the turbine section 150. Collectively, the depicted portions of the compressor section 130, combustion section 140, turbine section 150, and the transitions therebetween may be referred to as an engine assembly 200. In FIG. 2, only half the cross-sectional view of the engine assembly 200 is shown, and although not depicted, the other half is substantially rotationally symmetric about an axially extending engine centerline 202.

In the depicted embodiment, the compressor section 130 includes a two-stage centrifugal compressor 132 (partially shown) with an impeller 206, a shroud 208, and a diffuser 210. The impeller 206 is mounted on the output shaft 114, via a hub 212, and is thus rotationally driven by the turbine section 150 (or a starter-generator, not shown). A number of spaced-apart blades 214 extend generally radially from the hub 212 and together therewith define a leading edge 201 and a trailing edge 203. During operation, when the impeller 206 is rotated, the blades 214 draw air into the impeller 206, via the leading edge 201, and increase the velocity of the air to a relatively high velocity. The relatively high velocity air is then discharged from the impeller 206, via the trailing edge 203. The shroud 208 is disposed adjacent to, and partially surrounds, the impeller blades 214. The shroud 208 cooperates with an annular inlet duct 218 to direct the air drawn through the compressor 132 and onto the impeller 206.

The diffuser 210 is a radial vane diffuser that is disposed adjacent to, and surrounds a portion of, the impeller 206. The diffuser 210 functions to condition the air for introduction into the combustion section 140. In particular, the diffuser 210 is configured to direct a flow of compressed air with a radial component to a diffused annular flow having an axial component. The diffuser 210 additionally reduces the velocity of the air and increases the pressure of the air to a higher magnitude. The diffuser 210 includes a housing 221 and a plurality of diffuser vanes 226.

The diffuser housing 221 defines an air inlet 222 and an air outlet 224. The diffuser housing 221 also defines a radial section 230, an axial section 232, and a transition 234 between the air inlet and outlet 222, 224. The radial section 230 extends at least substantially radially outward from the air inlet 222 to the transition 234. The axial section 232 extends at least substantially axially from the transition 234 to the air outlet 224. The transition 234 includes a bend 236 and extends between the radial section 230 and the axial section 232. As an example, the bend 236 provides a continuous turn between the radial section 230 and the axial section 232.

The diffuser vanes 226 are coupled to the diffuser housing 221 and disposed, in this embodiment, in the radial section 230. The diffuser vanes 226 define diffusion flow passages 238 through the radial section 230. The diffuser vanes 226 may be arranged substantially tangential to the impeller trailing edge 203 and, similar to the impeller blades 214, define a leading edge 209 and a trailing edge 211. Any number of diffuser vanes 226 may be provided based on various considerations, including weight, parts count, complexity, aerodynamic performance, and efficiency. The particular number of diffuser vanes 226 is generally referred to as a vane count. As described below, the vane count of the diffuser vanes 226 additionally may be based on a predetermined relationship with downstream components, including components of the combustion section 140 and the turbine section 150. In one exemplary embodiment, each diffuser vane 226 has a relatively constant cross sectional (2D) shape, but other shapes may include twisted (3D) vanes.

In some exemplary embodiments, and as depicted in FIG. 2, the diffuser 210 may additionally include a number of integral deswirl vanes 228. The integral deswirl vanes 228 may also be referred to as service or splitter vanes. The integral deswirl vanes 228 are coupled to the diffuser housing 221 and generally function to at least partially deswirl the air discharged from the axial section 232. In some embodiments, the integral service vanes 228 extend around the bend 236 in the transition 234, although in the depicted exemplary embodiment, the integral service vanes 228 are positioned in the axial section 232. In some exemplary embodiments, the integral deswirl vanes 228 may be omitted and/or be replaced or supplemented by a separate deswirl apparatus. Any number of integral deswirl vanes 228 may be provided based on various considerations, including weight, parts count, complexity, aerodynamic performance, and efficiency. The particular number of deswirl vanes 228 is generally referred to as a deswirl vane count. In some embodiments, the deswirl vane count of the deswirl vanes 228 additionally may be based on a predetermined relationship with other components. As an example, the deswirl vane count may be equal to the vane count of the diffuser vanes 226. In one exemplary embodiment, each deswirl vane 228 has a relatively constant cross sectional (2D) shape, but other shapes may include twisted (3D) vanes. Additionally, in some embodiments, the deswirl vanes 228 may include apertures such that services (e.g., air or oil) may be routed through the deswirl vanes 228. Such deswirl vanes 228 may be thicker to accommodate the services. Although not shown, additionally rows of diffuser vanes 226 and deswirl vanes 228 may be provided. Additional vane details may be provided in U.S. Pat. No. 7,717,672, which is hereby incorporated by reference.

The compressed air flows from the diffuser 210 into the combustion section 140. Generally, the combustion section 140 has a radially inner case 248 and a radially outer case 250 concentrically arranged with respect to the inner case 248. The inner and outer cases 248, 250 circumscribe the axially extending engine shaft 114. The combustion section 140 includes a combustor 256 defined by an outer liner 260 circumscribing an inner liner 258 to define an annular combustion chamber 252. The liners 258, 260 cooperate with cases 248, 250 to define respective inner and outer air plenums 264, 266.

The combustor 256 includes a front end assembly 268 having an annularly extending shroud 270 and fuel injection assemblies 272. One fuel injector assembly 272 is shown in the partial cross-sectional view of FIG. 2, but as described below, exemplary embodiments include a number of such fuel injection assemblies 272.

The shroud 270 extends between and is secured to the forward-most ends of the inner and outer liners 258, 260. A number of circumferentially distributed shroud ports 278 accommodate the fuel injection assemblies 272 and introduce air into the forward end of the combustion chamber 252. Each fuel injection assembly 272 is secured to the outer case 250 and projects through one of the shroud ports 278, and each fuel injection assembly 272 introduces a swirling, intimately blended fuel-air mixture that supports combustion in the combustion chamber 252. An igniter (not shown) extends through the outer plenum 266 to the outer liner 260 and is positioned to ignite the fuel-air mixture, thereby resulting in high energy combustion gases the exit the combustor 256 into the turbine section 150.

Any number of fuel injection assemblies 272 may be provided. The particular number of fuel injection assemblies 272 is generally referred to as the fuel injection assembly count. As described below, the fuel injection assembly count may be determined in conjunction with other components of the engine assembly 200, including based on the vane count of the diffuser vanes 226.

As partially shown in FIG. 2, the turbine section 150 generally includes turbine nozzle assembly 280 having a number of vanes 282 to receive the combustion gases prior to impingement on the turbine rotors (not shown) for driving the shaft 114. Any number of turbine nozzle vanes 282 may be provided, although the number may be determined in conjunction with the number of fuel injection assemblies 272 and/or diffuser vanes 226, as will be described in greater detail below.

FIGS. 3-6 are schematic cross-section views depicting diffuser vanes 226 and fuel injection assemblies 272 of the engine assembly 200 of FIG. 2 in accordance with various exemplary embodiments. Generally, FIGS. 3-6 depict views in a radial-circumferential plane and particularly show the relationship between the diffuser vanes 226 and the fuel injection assemblies 272. As shown, the number and relative positions of the diffuser vanes 226 and fuel injection assemblies 272 are depicted about the engine centerline 202.

As described with respect to the particular embodiments below, the vane count of the diffuser vanes 226 and the fuel injection assembly count of the fuel injection assemblies 272 have a predetermined relationship. In particular, the vane count may be a whole number multiple (e.g., 1, 2, 3 . . . ) of the fuel injection assembly count. For example, the vane count may be equal to the fuel injection assembly count. In another example, the vane count may be twice the fuel injection count, three times the fuel injection count, and so on. Although the counts are predetermined, the relative positions may vary. As described below, the fuel injection assemblies 272 may be clocked relative to the diffuser vanes 226 or aligned with respect to the diffuser vanes 226. The relationship between vane count and the fuel injection assembly count enables each fuel injection assembly 272 to experience an identical wake from the diffuser vanes 226, thereby enabling the most desirable clocking about the engine assembly 200. This enables a reduction in pattern factor. Typically, pattern factor is a parameter that quantifies the variation in temperature entering the turbine section 150. In other words, a lower pattern factor results in fewer hot spots in the inlet temperature field, and as a result, longer turbine life.

Figure 3:
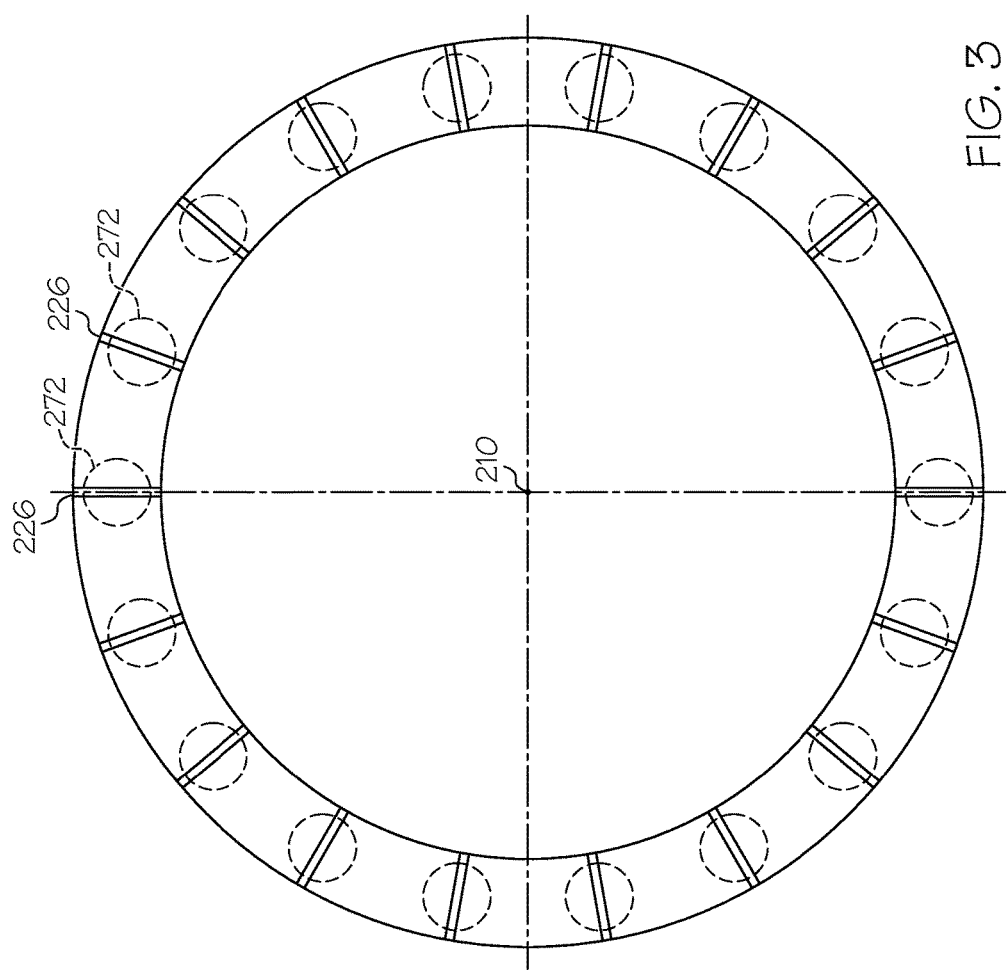
FIGS. 3-6 are schematic cross-section views depicting diffuser vanes and fuel injection assemblies of the engine assembly of FIG. 2 in accordance with exemplary embodiments.

Referring now to FIG. 3, in one exemplary embodiment, the vane count of the diffuser vanes 226 and the fuel injection assembly count of the fuel injection assemblies 272 are equal. In the example of FIG. 3, each of the vane count and the fuel injection assembly count is 18. As additionally depicted in FIG. 3, the diffuser vanes 226 and the fuel injection assemblies 272 are circumferentially aligned relative to one another.

Figure 4:
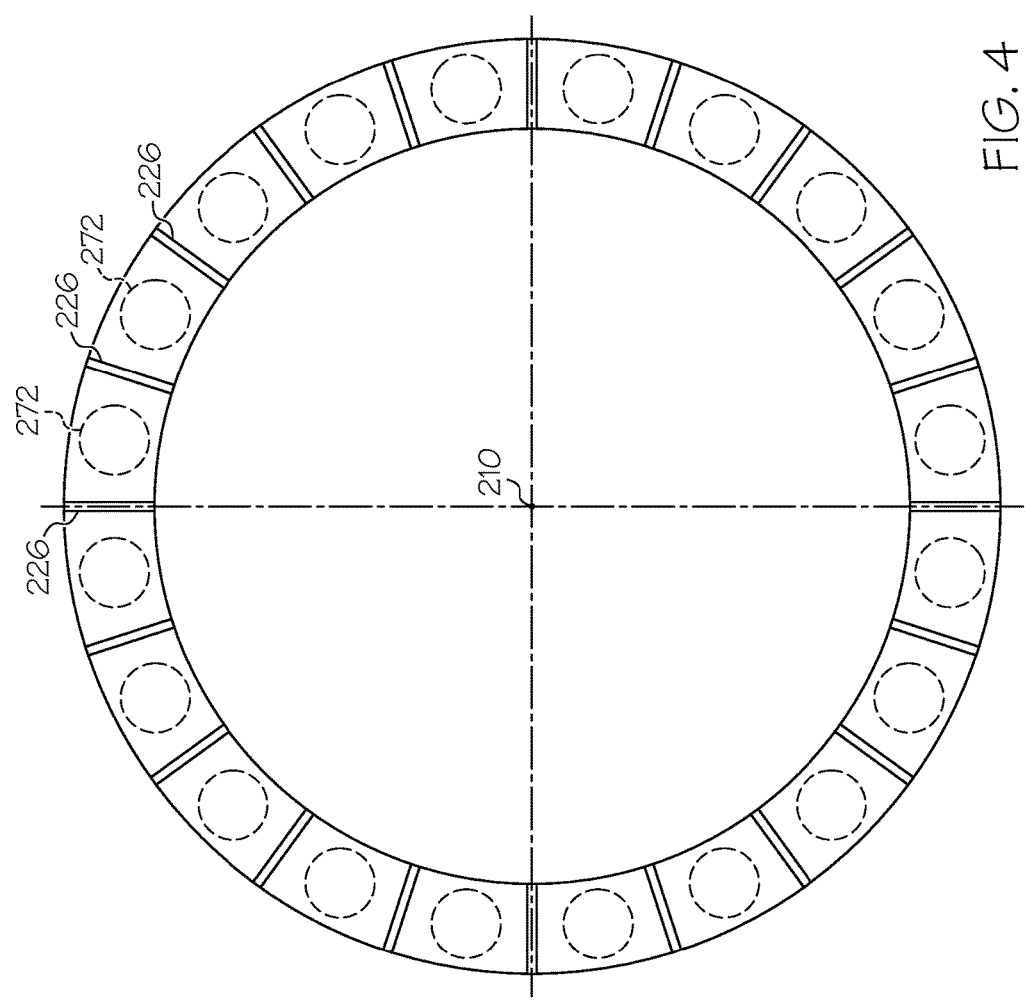

Referring now to FIG. 4, in one exemplary embodiment, the vane count of the diffuser vanes 226 and the fuel injection assembly count of the fuel injection assemblies 272 may be equal, as in the embodiment of FIG. 3. However, in the example of FIG. 4, the vane count and the fuel injection assembly count are 20. As additionally depicted in FIG. 4, the diffuser vanes 226 and the fuel injection assemblies 272 are arranged to be offset (or clocked) in a circumferential direction. In other words, the fuel injection assemblies 272 are respectively positioned in between adjacent pairs of diffuser vanes 226.

Figure 5:
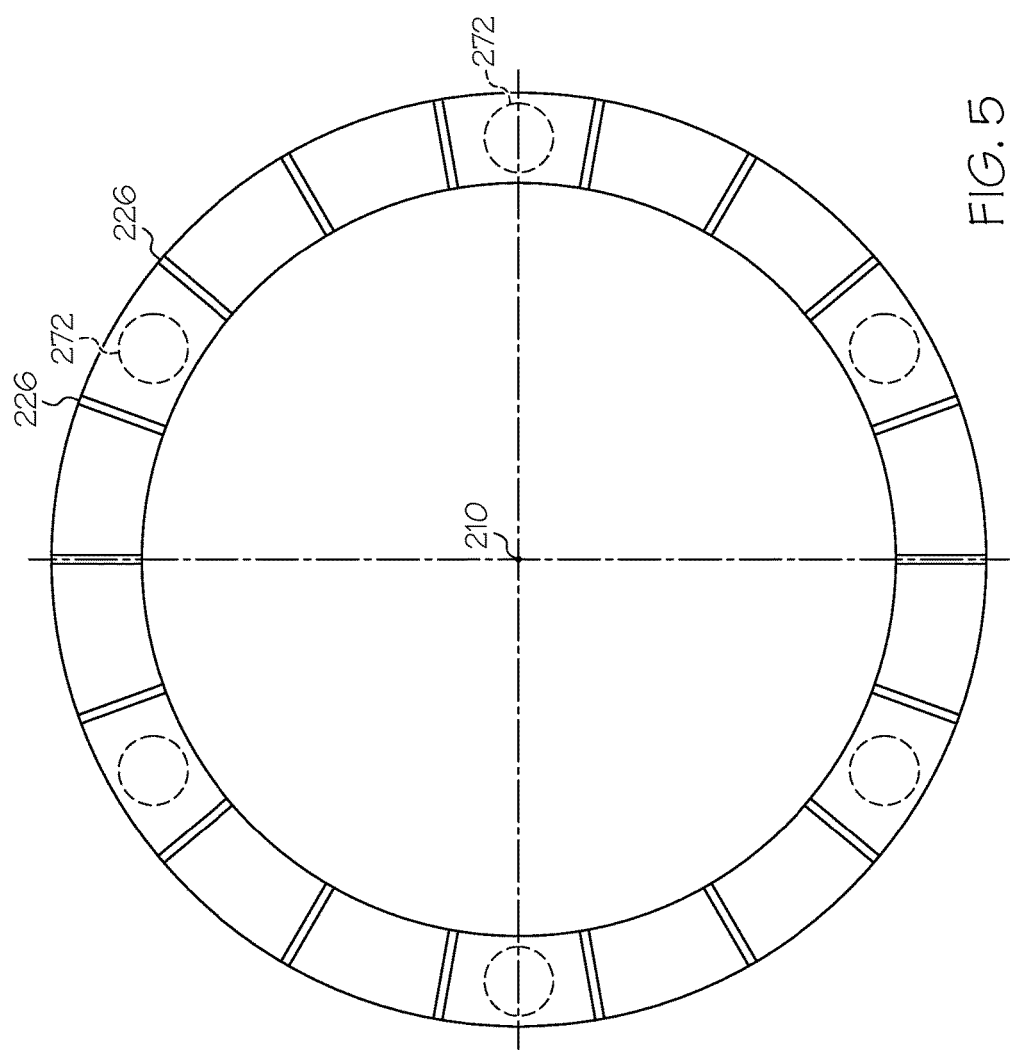

Referring now to FIG. 5, in another exemplary embodiment, the vane count of the diffuser vanes 226 is three times the fuel injection assembly count of the fuel injection assemblies 272. In the example of FIG. 5, the vane count is 18 and the fuel injection assembly count is six (6). Additionally, in this embodiment, the diffuser vanes 226 and the fuel injection assemblies 272 are offset (or clocked) in a circumferential direction such that an individual fuel injection assembly 272 is positioned in between adjacent diffuser vanes 226.

Figure 6:
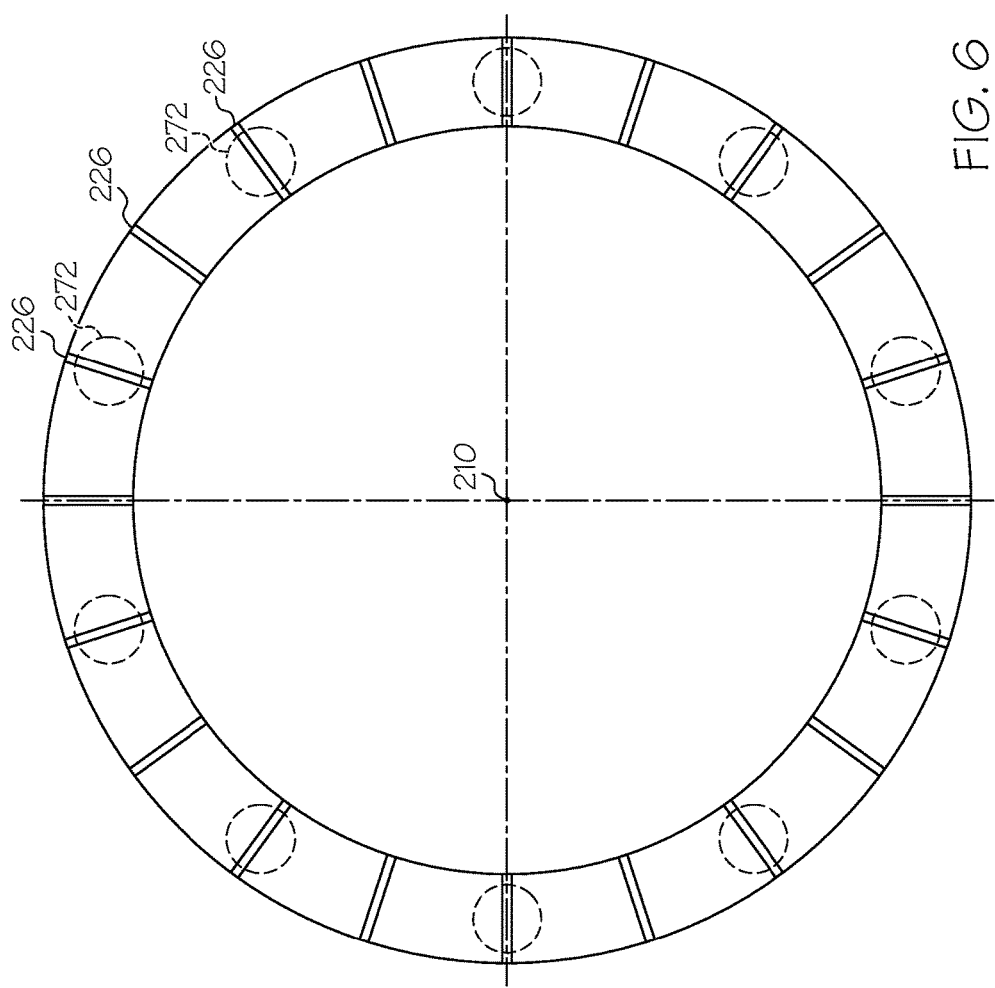

Referring now to FIG. 6, in another exemplary embodiment, the vane count of the diffuser vanes 226 is twice the fuel injection assembly count of the fuel injection assemblies 272. In the example of FIG. 6, the vane count is 20 and the fuel injection assembly count is 10. Additionally, in this embodiment, the diffuser vanes 226 and the fuel injection assemblies 272 are circumferentially aligned with one another.

As such, any number of diffuser vanes 226 and fuel injection assemblies 272 may be provided, although as described above, the vane count is a whole number multiple of the fuel injection assembly count. Typically, the diffuser vanes 226 and fuel injection assembly 272 may have any suitable circumferential positioning or clocking relative to one another based on flow characteristics.

Generally, the predetermined relationship between the vane count and the fuel injection assembly count enables each fuel injection assembly 272 to receive the same wake from the diffuser vanes 226. This enables an optimized positioning of fuel injection assemblies 272 and diffuser vanes 226. In some embodiments, these relationships enable a 25% reduction in pattern factor, thereby resulting in lower turbine temperatures, reduced cooling flow requirements, longer turbine life, reduced engine fuel consumption, and reduced engine-to-engine variation. In conventional engine designs, the vane count and the fuel injection assembly count are individually evaluated and selected based on localized considerations. Traditionally, designers tend to maximize vane count to reduce aerodynamic loading and increase stability and to minimize fuel injection assembly count to reduce cost. Although the exemplary embodiments discussed herein are contrary to these trends (e.g., in the form of a relatively low vane count and/or a relatively high fuel injection assembly count), the resulting overall engine design may increase efficiency and life span and reduce size, weight, cost and emissions. Generally, the exemplary embodiments discussed herein may be implemented with any type of a gas turbine engine, particularly engines having a centrifugal compressor with a vaned diffuser.

In some exemplary embodiments, the vane count and the fuel injection assembly count may also be selected with respect to the deswirl vane count and turbine nozzle vane count. For example, the deswirl vane count and turbine nozzle vane count may be equal to the diffuser vane count and/or the fuel injection assembly count.

Although an engine assembly is described above, exemplary embodiments further include a method for designing such engine assemblies. As an example, in one step, the compressor section is designed, including selecting the vane count. In another step, the combustion section is designed, including selection of the fuel injection assembly count such that the vane count is a whole number multiple of the fuel injection assembly count. In subsequent steps, the counts may be increased or decreased based on the predetermined relationships, and the relative positions are selected based on reduced pattern factor, among other considerations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine assembly, comprising:
a centrifugal compressor section configured to supply compressed air, the compressor section comprising a diffuser with a plurality of diffuser vanes to condition the compressed air, wherein the plurality of diffuser vanes has a vane count of a first value; and
a combustion section coupled to the compressor section, the combustion section comprising an annular combustion chamber to receive the compressed air and a plurality of fuel injection assemblies configured to introduce fuel into the combustion chamber, wherein the plurality of fuel injection assemblies has a fuel injection assembly count of a second value, and wherein the first value is a whole number multiple of the second value,
wherein the diffuser includes a diffuser housing defining a radial section extending at least substantially radially outward from an air inlet to a transition and an axial section extending at least substantially axially from the transition to an air outlet, and wherein the plurality of diffuser vanes are positioned within the radial section of the diffuser housing.

2. The engine assembly of claim 1, wherein the first value is equal to the second value.

3. The engine assembly of claim 1, wherein the first value is twice the second value.

4. The engine assembly of claim 1, wherein the first value is three times the second value.

5. The engine assembly of claim 1, wherein the plurality of diffuser vanes is circumferentially aligned with the plurality of fuel injection assemblies.

6. The engine assembly of claim 1, wherein the plurality of diffuser vanes is circumferentially clocked with respect to the plurality of fuel injection assemblies.

7. The engine assembly of claim 1, wherein the diffuser further comprises deswirl vanes arranged within the axial section of the diffuser housing.

8. The engine assembly of claim 7, wherein the deswirl vanes have a deswirl vane count equal to the first value.

9. A method for designing an engine assembly, comprising the steps of:
providing a centrifugal compressor section configured to supply compressed air, the compressor section comprising a diffuser with a plurality of diffuser vanes to condition the compressed air;
providing a combustion section coupled to the compressor section, the combustion section comprising an annular combustion chamber to receive the compressed air and a plurality of fuel injection assemblies configured to introduce fuel into the combustion chamber; and
selecting a fuel injection assembly count and a diffuser vane count such that the diffuser vane count is a whole number multiple of the fuel injection assembly count, wherein the diffuser includes a diffuser housing defining a radial section extending at least substantially radially outward from an air inlet to a transition and an axial section extending at least substantially axially from the transition to an air outlet, and wherein the plurality of diffuser vanes are positioned within the radial section of the diffuser housing.

10. The method of claim 9, wherein the selecting step includes selecting the fuel injection assembly count and the diffuser vane count such that the diffuser vane count and the fuel injection assembly count are equal.

11. The method of claim 9, wherein the selecting step includes selecting the fuel injection assembly count and the diffuser vane count such that the diffuser vane count is twice the fuel injection assembly count.

12. The method of claim 9, wherein the selecting step includes selecting the fuel injection assembly count and the diffuser vane count such that the diffuser vane count is three times the fuel injection assembly count.

13. The method of claim 9, further comprising the step of circumferentially aligning the plurality of diffuser vanes with the plurality of fuel injection assemblies.

14. The method of claim 9, further comprising the step of circumferentially clocking the plurality of diffuser vanes relative to the plurality of fuel injection assemblies.

* * * * *